Dec. 30, 1941.  D. S. BOND  2,268,107
RADIATION SYSTEM FOR ESTABLISHING RADIO COURSES
Filed April 29, 1939
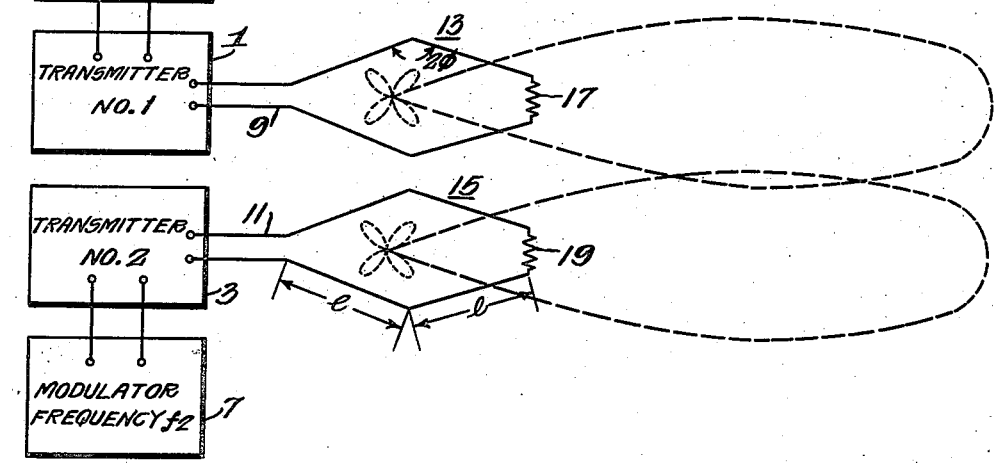
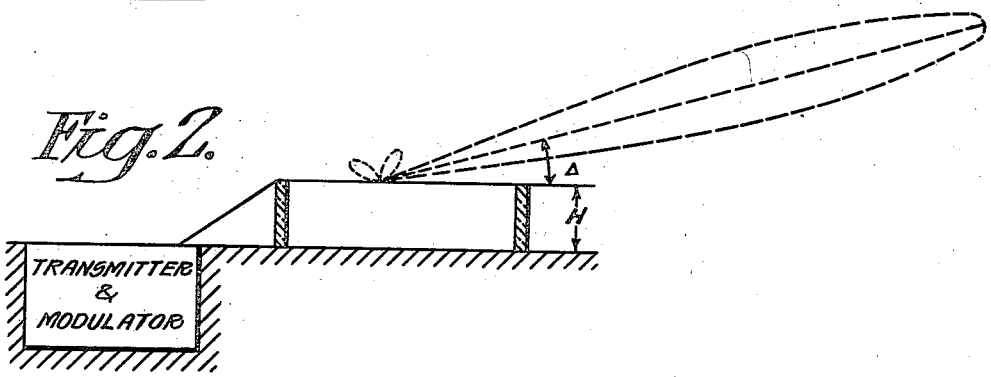
Inventor
Donald S. Bond
By
Attorney Patented Dec. 30, 1941

2,268,107

UNITED STATES PATENT OFFICE 2,268,107

RADIATION SYSTEM FOR ESTABLISHING RADIO COURSES

Donald S. Bond, Philadelphia, Pa., assignor to Radio Corporation of America, a corporation of Delaware Application April 29, 1939, Serial No. 270,830

6 Claims. (Cl. 250—11)

This invention relates to a radiation system for establishing radio courses and more specifically to a system including rhombic antennas for establishing a radio guide path such as used for the instrument landing of aircraft.

In one of the prior art systems for the instrument landing of aircraft, a pair of overlapping fields are created by keying alternately a pair of vertical reflectors located on either side of a vertical radiator. The navigator or pilot of a craft utilizing the system follows a unipotential signal to effect a landing. It has been found that the unipotential path is distroyed by passing over reinforced concrete, railroad tracks, transmission wires and the like.

Since horizontally polarized waves are less affected, it has been proposed that horizontal dipoles be substituted as radiators. While the horizontally polarized waves are less distorted by the intervening conductors, the earth usually reflects the horizontally polarized waves upwardly with greater intensity than it does the vertically polarized waves. In either case, the ground reflection may deleteriously alter the glide path. Another objection is that the separate radiators are coupled by either inductive or radiation fields. This coupling alters the respective fields. A further objection lies in the very substantial obstacle which the antennas present to an airplane overshooting or slightly off the runway.

The present invention has for one of its objects the provision of means for establishing a radio guide path. Another object is to provide means for radiating overlapping fields including a plane at a predetermined angle with respect to the earth's surface. Another object is to provide a pair of rhombic antennas and means for energizing the antennas so that their radiation patterns overlap and form glide and guide paths for an aircraft landing system. A further object is to provide radiators which are so designed and arranged that the coupling between them is negligible and so that the radiation, reflected from the earth, aids in establishing a glide path for aircraft.

The invention will be described by referring to the accompanying drawing in which Figure 1 is a schematic representation of the invention; and Figure 2 is an elevational view of the antenna positioned on the runway of an airport.

Referring to Fig. 1, a pair of radio transmitters 1, 3 are connected to modulators 5, 7 which, respectively, apply to the transmitter currents of modulation frequencies $f_1$, $f_2$. The outputs from the transmitters are applied, through the transmission lines 9, 11 to the rhombic antennas 13, 15. The rhombic antennas are terminated in resistors 17, 19. The antennas are arranged so that the plane, including the conductors, is horizontal. The radiation in the horizontal plane is substantially zero and, therefore, the interaction of the antennas is negligible. The mutual inductance, and therefore the inductive coupling, is made low by spacing the antennas several wave lengths.

The desired upward radiation is obtained by adjusting the lengths of the sides of the several conductors, by adjusting the "tilt angle" $\phi$, and by regulating the height of the plane above the ground. The ground becomes the reflector which is one of the means used to obtain the angle $\Delta$. For a perfect ground (a reasonable approximation in practice), the amplitude of the signal radiated upward at an angle $\Delta$ in a vertical plane containing the array is $$E = E_0 \sin\left(\frac{2\pi H}{\lambda} \sin \Delta\right) \cdot \frac{\cos \phi}{1-\sin \phi \cos \Delta} \cdot \frac{\sin^2 \pi l(1-\sin \phi \cos \Delta)}{\lambda}$$

For desired values of $\Delta$ and $\lambda$, maximum radiation is found for a minimum height of $$H = \frac{\lambda}{4 \sin \Delta}$$

the optimum lengths of a side of the array is, for this value $$l = \frac{8H^2}{\lambda}$$

and the tilt angle $$\phi = \frac{\pi}{2} - \Delta$$

By employing frequencies of the order of five hundred megacycles per second, the rhombic antenna lengths will be of the order of ten meters and the height above the ground may be made less than one meter  A structure of this size may be supported on semi-flexible poles which would yield if an airplane struck the antenna. Furthermore, the main wing and propeller of the average airplane would clear the supports when the plane is on the ground.

In aligning the separate antennas, the angle between their longitudinal axes is adjusted until the desired degree of overlapping of the respective fields is obtained. In some installations, the planes of the antennas may be tilted to obtain the desired angular disposition of the glide path, the height of the antenna above the earth will regulate the reflection and hence the angle of the radiation. Furthermore, different Δ's for the two arrays may be used to make fields overlap in the vertical plane. It is also practical to employ more than two arrays to effect any desired combination of overlapping fields in both vertical and horizontal planes.

I claim as my invention:

1. An aircraft landing system including a pair of rhombic antennas having their longitudinal axes and conductors arranged substantially in the same plane and spaced apart several wavelengths to minimize inductive coupling, means for energizing said antennas at their near ends, means terminating the remote end of each of the antennas so that said energy is radiated primarily along said longitudinal axes and toward said remote ends forming an overlapping region of equal field strength, and supports for maintaining the antennas above the earth less than the propeller and wing clearances of said aircraft and at a height which determines the angle of radiation of said overlapping region and forms a glide path for guiding aircraft to a landing.

2. An aircraft landing system including a pair of rhombic antennas arranged in the same horizontal plane and spaced apart at least a wavelength to minimize inductive coupling, means energizing said antennas at their open ends, means closing the remote ends of said antennas so that said energy is radiated primarily along the direction opposite said open ends forming an overlapping region of equal field strength to form a runway localizer path for aircraft, and supports for maintaining the antennas above the earth at a height at which the overlapping radiation from the antennas is at the angle of the glide path normally used for landing aircraft and at a height less than the propeller and wing clearances of said aircraft.

3. An aircraft landing system including a pair of rhombic antennas arranged substantially in the same plane and spaced so that their mutual coupling is substantially zero, means for energizing said antennas so that the radiation of said energy overlaps in a predetermined region, means for supporting said antennas above the earth a distance which determines the angle of radiation and at a height less than the ground clearance of the wings and propeller of said aircraft, and means for modulating said energy so that said predetermined region may be detected and followed for landing aircraft.

4. An aircraft landing system including a pair of rhombic antennas arranged in the same horizontal plane and spaced apart several wavelengths to minimize inductive coupling, means for energizing said antennas so that the radiation of said energy overlaps in a predetermined region and forms a zone of equal field strengths, means for supporting said antennas at a height above the earth to obtain by earth reflection the desired angle of radiation and at a height less than the clearance of the propeller and wings of said aircraft, and means for applying distinctive modulation to the energy applied to said antennas so that said fields and zone of equal field strengths may be identified by detection.

5. A system of the character of claim 3 further characterized by means for applying distinctive modulation to said antennas.

6. An aircraft landing system including a pair of rhombic antennas having their longitudinal axes and conductors arranged in the same horizontal plane and disposed at an angle, means for energizing said antennas, semi-flexible means supporting said antennas a distance minimizing inductive coupling and establishing overlapping field patterns produced by the radiation of said energy, said flexible means having a height above earth at which a predetermined angle of radiation is obtained by earth reflection and at a height less than the clearance of the propellers and wings of said aircraft, and means for applying distinctive modulation to the energy applied to said antennas so that said overlapping field patterns form a localizer and glide path for aircraft.

DONALD S. BOND.